(12) United States Patent  (10) Patent No.: US 7,717,456 B2
Chen et al.  (45) Date of Patent: May 18, 2010

(54) STROLLER WITH LINKAGE ASSEMBLY (75) Inventors: Shun-Min Chen, Taipei (TW); Zhi-Ren Zhong, Taipei (TW); Jian-Qun Li, Taipei (TW)

(73) Assignee: Wonderland NurseryGoods Co., Ltd., Neihu, Taipei (TW)

( * ) Notice: Subject to any disclaimer, the term of this patent is extended or adjusted under 35 U.S.C. 154(b) by 160 days.

(21) Appl. No.: 11/782,654

(22) Filed: Jul. 25, 2007

(65) Prior Publication Data

US 2008/0185821 A1 Aug. 7, 2008

Related U.S. Application Data (60) Provisional application No. 60/887,610, filed on Feb. 1, 2007.

(51) Int. Cl.
*B62B 1/00* (2006.01)
(52) U.S. Cl. ................ 280/642; 280/649; 280/650
(58) Field of Classification Search ............. 280/642, 280/649, 647, 650, 658, 47.4, 47.7, 47.36
See application file for complete search history.

(56) References Cited

U.S. PATENT DOCUMENTS

| | | | |
|---|---|---|---|
| 3,550,998 A | | 12/1970 | Boudreau et al. |
| 3,556,546 A | | 1/1971 | Garner |
| 5,478,102 A | * | 12/1995 | Haung ............... 280/642 |
| 5,549,311 A | | 8/1996 | Huang |
| 5,788,604 A | * | 8/1998 | Brown et al. ............ 280/642 |
| 5,806,877 A | * | 9/1998 | Huang ............... 280/642 |
| 5,823,564 A | * | 10/1998 | Kettler ............... 280/642 |
| 5,833,261 A | * | 11/1998 | Brown et al. ............ 280/642 |
| 5,845,924 A | * | 12/1998 | Huang ............... 280/642 |
| 6,361,056 B1 | * | 3/2002 | Chen et al. ............ 280/47.4 |
| 6,375,213 B1 | * | 4/2002 | Suzuki ............... 280/649 |
| 6,464,242 B2 | * | 10/2002 | Suzuki ............... 280/642 |
| 6,814,368 B2 | * | 11/2004 | Cheng ............... 280/642 |
| 6,877,760 B2 | * | 4/2005 | Wang ............... 280/642 |
| 7,445,229 B2 | * | 11/2008 | Dotsey et al. ............ 280/642 |
| 2003/0201626 A1 | | 10/2003 | Hartenstine et al. |
| 2006/0125210 A1 | | 6/2006 | Fox et al. |

FOREIGN PATENT DOCUMENTS

| DE | 299 15 368 U1 | 12/1999 |
|---|---|---|
| DE | 20 2004 015 236 U1 | 4/2005 |
| GB | 2 319 227 A | 5/1998 |
| GB | 2 330 116 A | 4/1999 |

\* cited by examiner

*Primary Examiner*—Hau V Phan
(74) *Attorney, Agent, or Firm*—Winston Hsu (57) ABSTRACT

The stroller applies a first link of the linkage assembly pivotally connecting between the handle and the protecting guard and a second link of the linkage pivotally connecting between the front frame and the protecting guard. During the folding process of the stroller, the first and the second links drive the protecting guard to move and rotate to a position that is substantially parallel with the handle, the front frame, the rear frame, and the bottom frame, bringing the stroller to a smallest size when in the folded position.

17 Claims, 9 Drawing Sheets

STROLLER WITH LINKAGE ASSEMBLY

CROSS REFERENCE TO RELATED APPLICATIONS

This application claims the benefit of U.S. Provisional Application No. 60/887,610, which was filed on Feb. 1, 2007 and is incorporated herein by reference.

BACKGROUND OF THE INVENTION

1. Field of the Invention

The present invention relates to a stroller, and more specifically, to a stroller with linkage assembly.

2. Description of the Prior Art

Most strollers in the present market have folding apparatus to fold the strollers into a smaller size for easy transportation. In the mean time, to provide convenience and safety for the child therein, the strollers usually have protecting guard composed by armrests and a tray according to the prior art. However, the protecting guard usually takes more space than is expected in a folded stroller when effort is made to fold the stroller to a small size. Examples for description purpose are listed in the U.S. Pat. No. 3,550,998 and in the U.S. patent application #2003/0201626A1, which in both the disclosures, the armrests stretch out of the stroller and take more space when the stroller is folded.

There is another example that illustrates a stroller having a detachable tray, such as the U.S. patent application 2006/0125210A1, which assembles the tray on the stroller by a mechanism and if the size of the folded stroller is to be reduced to a smallest scale, the tray needs to be detached from the stroller first.

SUMMARY OF THE INVENTION

The claimed invention provides a stroller with linkage assembly. The stroller comprises a frame body, a seat assembly comprising a protecting guard, and a linkage assembly. The frame body comprises a handle, a rear frame, and a front frame where the handle pivotally connects with the rear frame and the front frame. The linkage assembly comprises a first link and a second link respectively positioned at the rear of and at the front of the seat assembly. The first link pivotally connects with the handle and the protection guard and the second link pivotally connects with the protecting guard and the front frame. The seat assembly and the frame body are driven to fold by the linkage assembly, and the seat assembly, the handle, the rear frame, and the front frame are substantially parallel with one another while the stroller is in a folded position.

The claimed invention also provides a stroller. The stroller comprises a frame body, a seat assembly, and a linkage assembly. The frame body comprises a handle, a rear frame, and a front frame, the handle pivotally connecting with the rear frame and the front frame. The seat assembly comprises a protecting guard positioned at the front. The linkage assembly comprises a first link and a second link. The first link pivotally connects with the handle and the rear of the seat assembly, and the second link pivotally connects with the protecting guard and the front frame. When the stroller is moved from an opened position to a folded position, the handle, the front frame and the rear frame pivot to approach to each other, so that the linkage assembly drives the protection guard to move closely to the front frame and the rear frame at the same time.

The claimed invention also provides a stroller. The stroller comprises a frame body, a seat assembly, and a linkage assembly. The frame body comprises front wheels, the seat assembly is mounted on the frame body and comprises a protecting guard, and the linkage assembly connects with the frame body and the seat assembly. When the stroller is moved from an opened position to a folded position, the linkage assembly drives the protecting guard to rotate and a front end of the protecting guard is moved toward the front wheels to bring the stroller to a smaller size.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
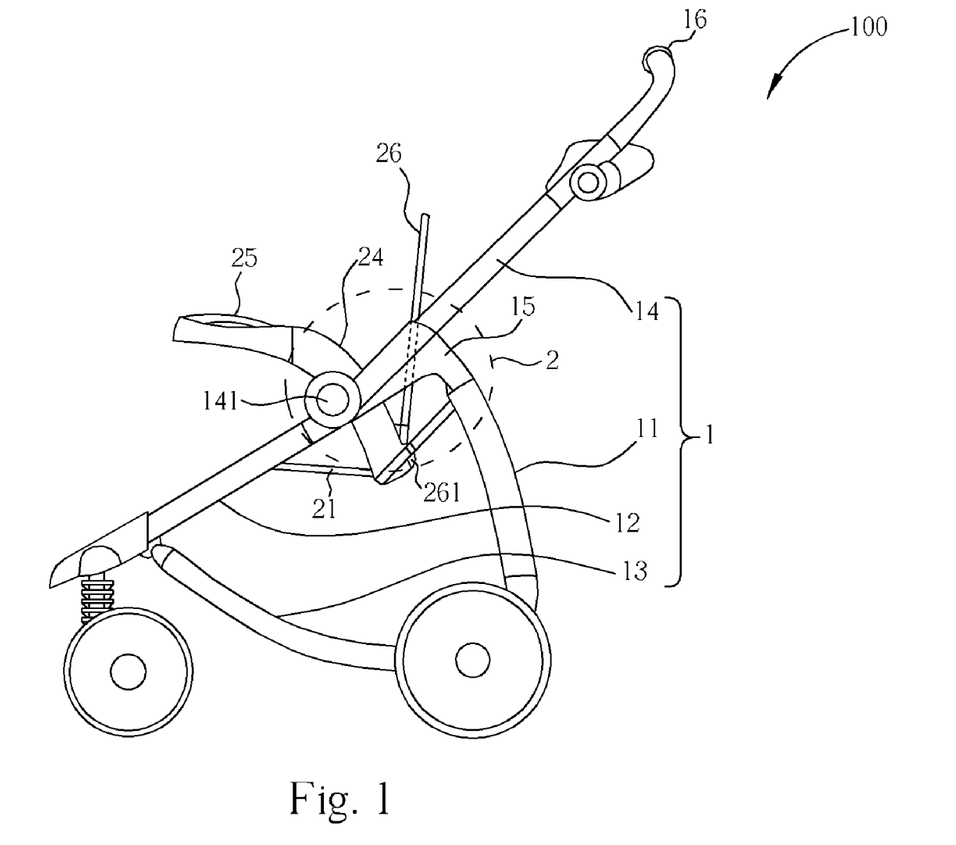
FIG. 1 is an illustration of a first exemplary embodiment of the stroller with linkage assembly according to the present invention.

The present invention implements a linkage assembly for moving a protecting guard on the seat assembly of a stroller when folding the stroller and the protecting guard brought from its opened position to a folded position such that the folded size of the stroller can be further reduced. The protecting guard in the embodiment can comprise two armrests at two sides of the seat and a tray connecting with the armrests. Please refer to FIG. 1. FIG. 1 is a first exemplary embodiment of the stroller 100 having linkage assembly according to the present invention. The stroller 100 comprises a frame body 1, a seat assembly, and a linkage assembly 2. The frame body 1 comprises a rear frame 11, a front frame 12, a bottom frame 13, and a handle 14. The handle 14 pivotally connects to the rear frame 11 via a substantially L-shape or V-shape connector 15 at one end of the handle 14. The bottom frame 13 pivotally connects between the rear frame 11 and the front frame 12. The handle 14 pivotally connects with the front frame 12 via a folding shaft 141 and in the exemplary embodiment, a latch (not shown in the figure) is configured between the handle 14 and the front frame 11 for keeping the frame body 1 in its opened position. The seat assembly comprises a seat frame 21, two armrests 24, a tray 25, and a backrest 26 where the seat frame 21, the armrests 24, and the backrest 26 are in connection with the frame body 1. The seat frame 21 is configured to place a seat for a baby child when the stroller 100 is in its opened position. The backrest 26 pivotally connects with the seat frame 21 and the armrests 24 pivotally connect with two sides of the seat frame 21 respectively. The armrests 24 and the tray 25 connecting with one end of the armrests 24 form the protecting guard above the seat to protect the baby child sitting therein.

Figure 2:
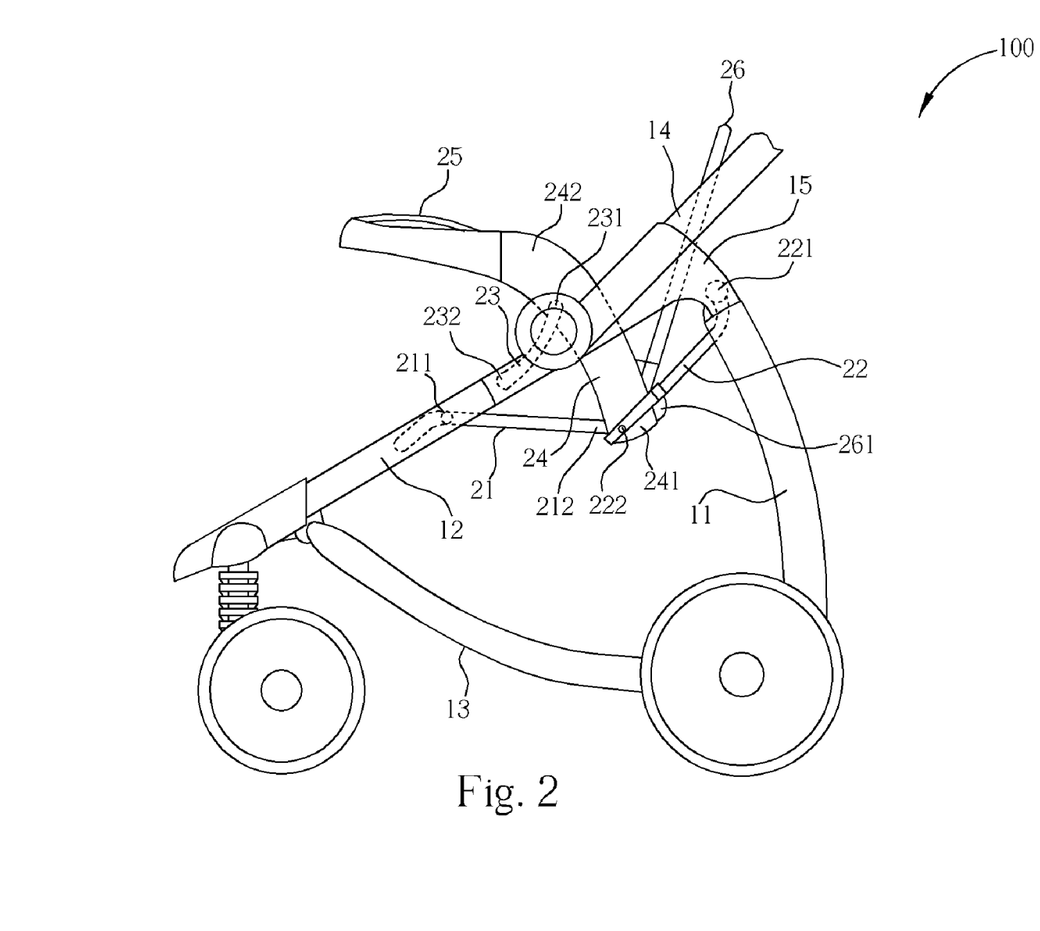
FIG. 2 to FIG. 6 are illustrations of relative movement between the seat assembly and the frame body when the stroller folds according to the present invention.
Figure 7:
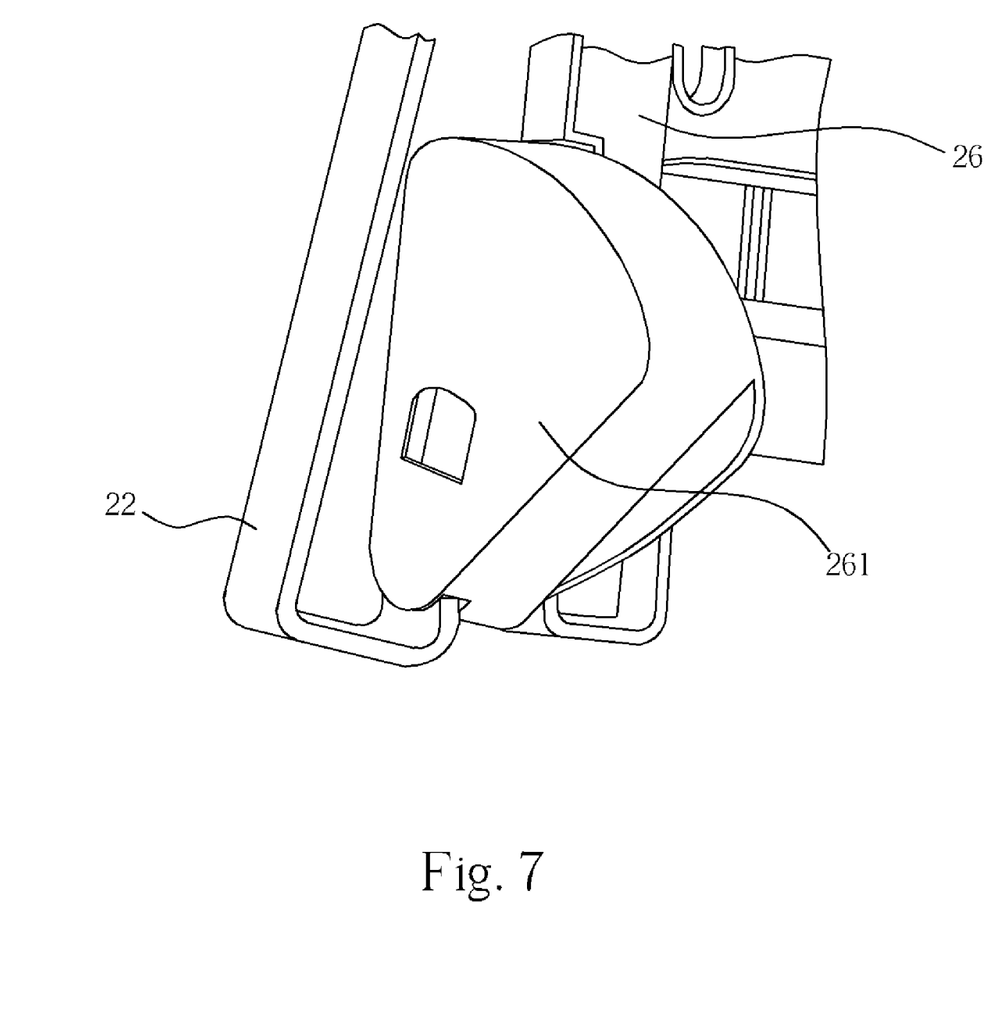
FIG. 7 and FIG. 8 are illustrations of a partial enlarged view of the linkage assembly according to the present invention.
Figure 8:
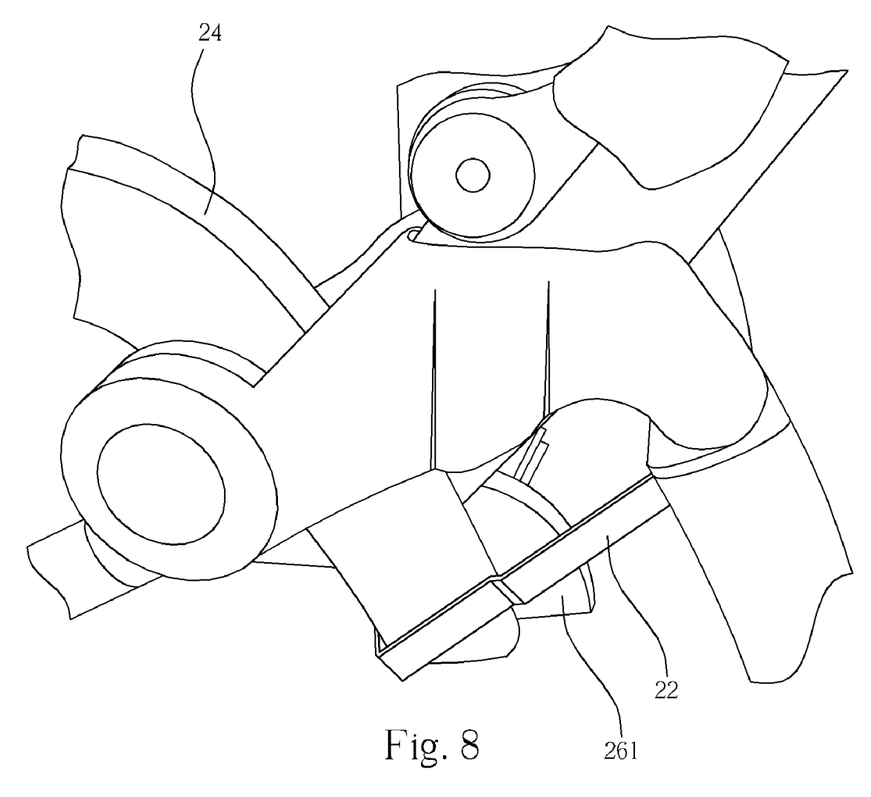

Please refer to FIG. 2. The linkage assembly 2 of the stroller 100 in the exemplary embodiment comprises a first link 22 and a second link 23, which are respectively positioned at the rear of the seat assembly and at the front of the seat assembly for respectively pivotally connecting with the handle 14 and the front frame 12 for brining the seat assembly to fold with the handle 14 and the front frame 12 when folding the frame body 1. In this embodiment, a first end 221 of the first link 22 pivotally connects with the connector 15 at which the connector 15 of the handle 14 pivotally connects with the rear frame 11. However, in other exemplary embodiments of the present invention, the first end 221 can pivotally connects to other section of the connector 15 or directly to the handle 14. Please also refer to FIG. 7 and FIG. 8. A backrest bracket 261 at the first end 241 of the armrest 24 is pivotally connected with the backrest 26. A second end 222 of the first link 22 is fixed with the first end 241 of the armrest 24 through the backrest bracket 261. The seat frame 21 has a first end 211 pivotally connecting with the front frame 12 and a second end 212 pivotally connecting with the first end 241 of the armrest 24. Therefore in the exemplary embodiment, the first end 241 of the armrest 24 pivotally connects with the second end 212 of the seat frame 21 and with the backrest 26 through the backrest bracket 261. The tray 25 is detachably connected to a second end 242 of the armrests 24 and when placing the child into the stroller 100 or removing the child from the stroller 100, the tray 25 can be detached from the second end 242 of the armrests 24 for convenience. Additionally, the stroller 100 of the present invention further configures the second link 23 of the linkage assembly 2 between the armrest 24 and the front frame 12 with a first end 231 pivotally connecting with the armrest 24 and a second end 232 pivotally connecting with the front frame 12.

Figure 9:
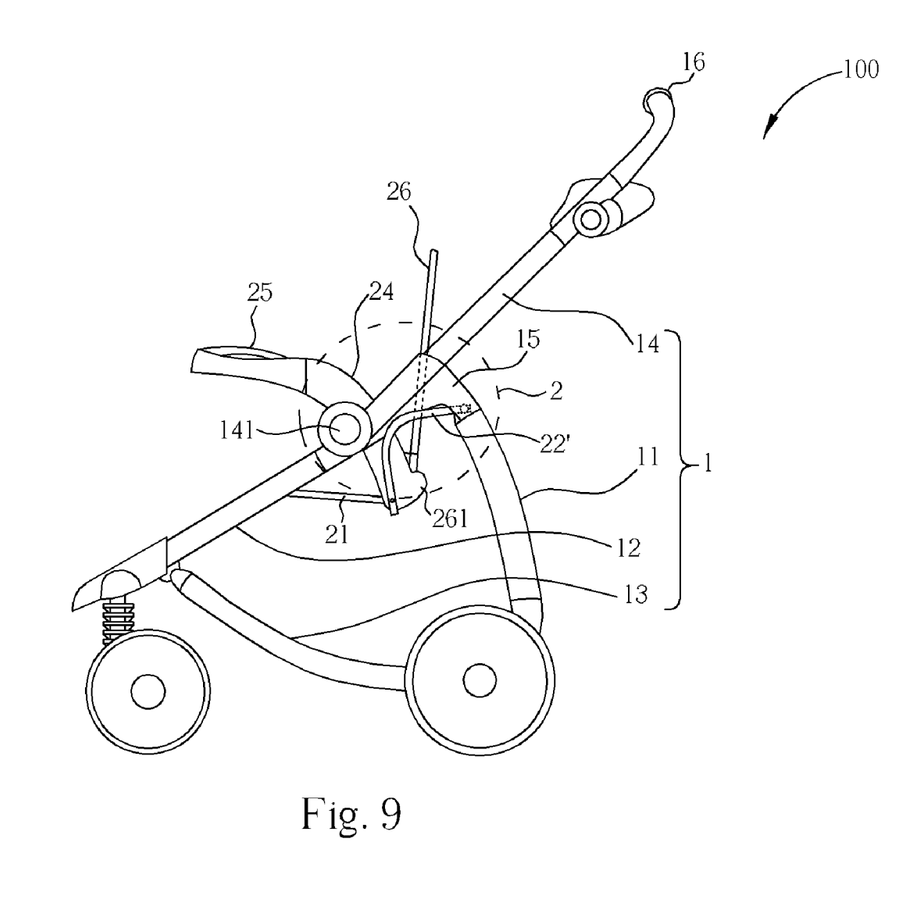
FIG. 9 is an illustration of a second exemplary embodiment according to the present invention.

Please refer to FIG. 9. In a second exemplary embodiment of the present invention, the first link 22' is substantially inverse L-shaped to provide safety for the operator when folding the stroller 1 while the way how the first link 22' is connected to other parts of the stroller 1 is similar to that of the first exemplary embodiment, which has been omitted for purposes of brevity.

Figure 3:
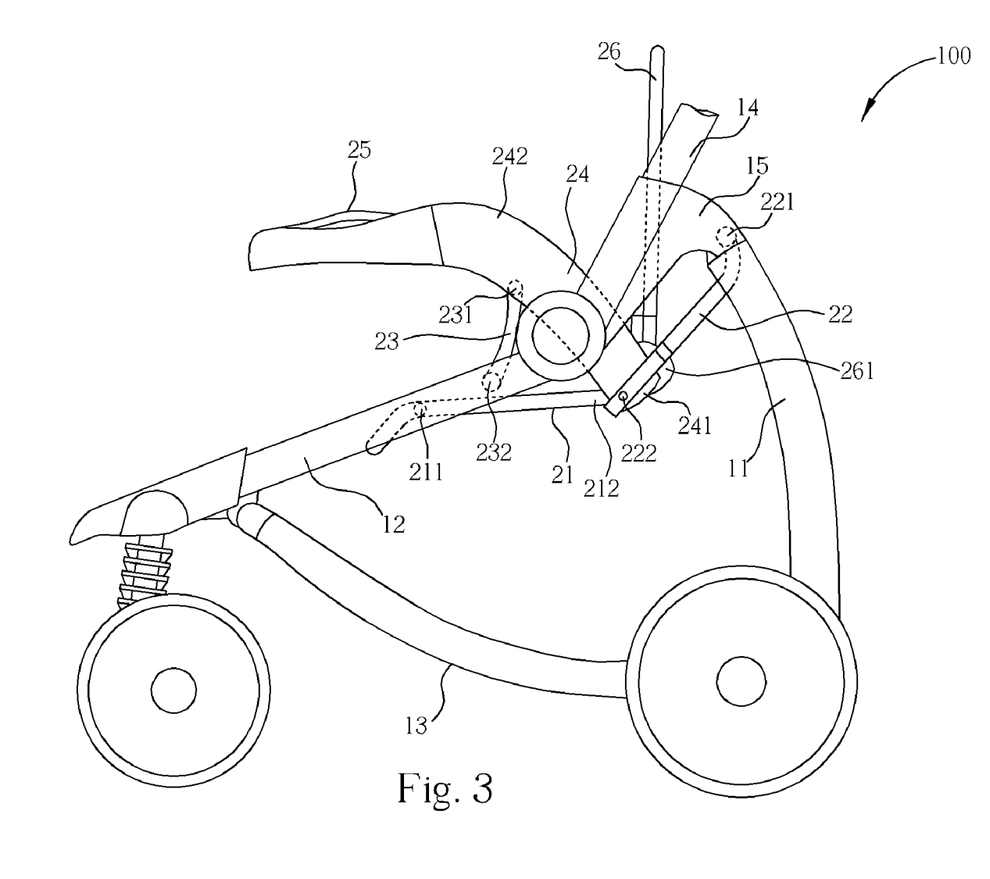
Figure 4:
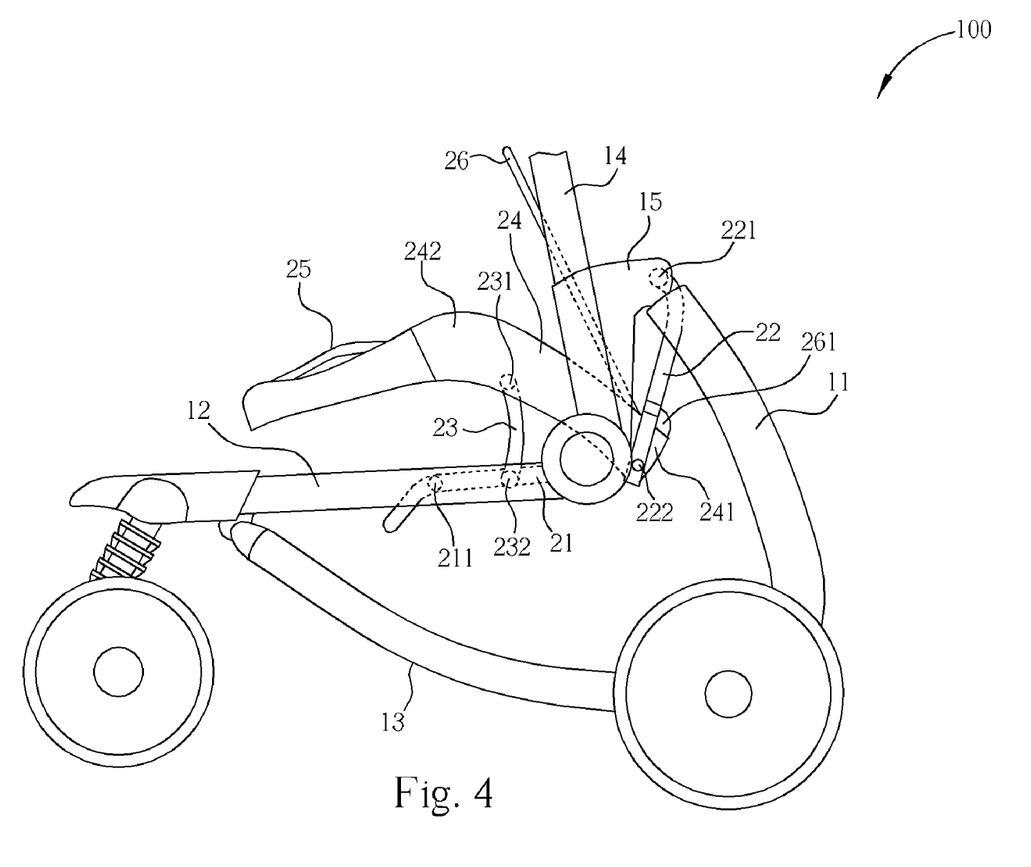
Figure 5:
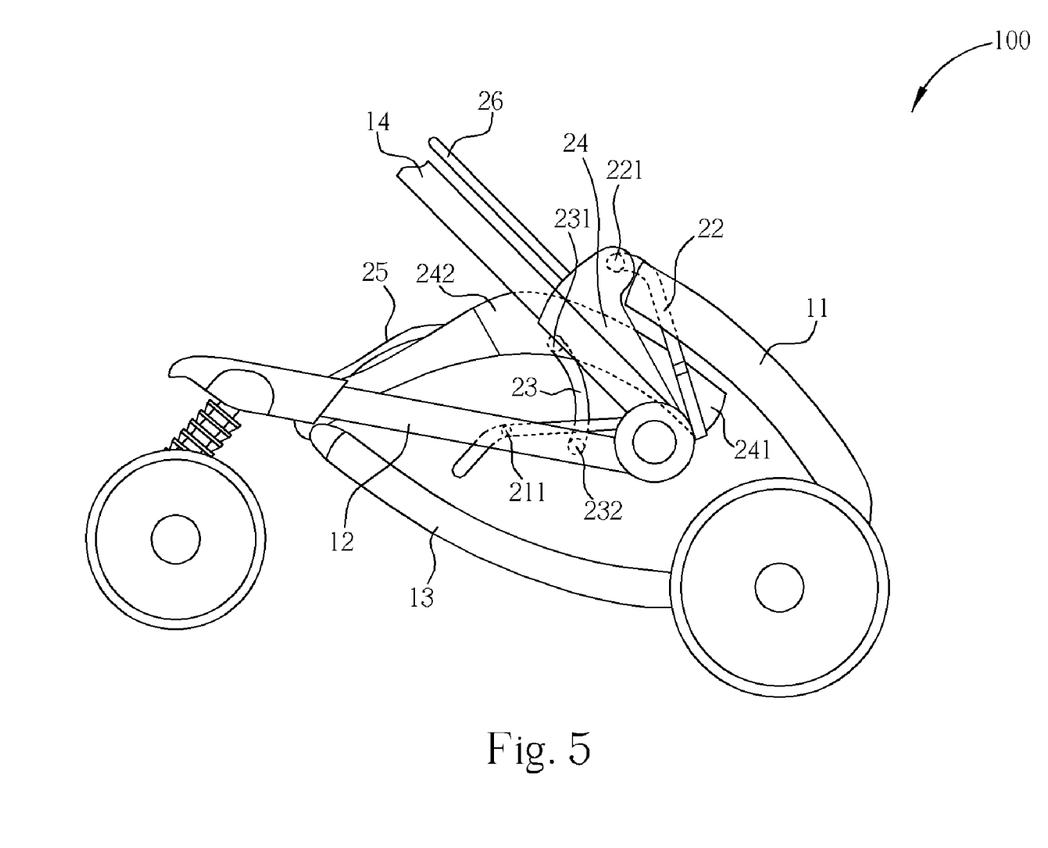

Please refer to FIG. 2 to FIG. 6, which are illustrations of relative movement between the seat assembly and the frame body 1 when the stroller 100 folds. When the stroller 100 is folded, a release device 16 on the handle 14 connecting the latch between the handle 14 and the front frame 12 is operated to make the handle 14 to rotate relative to the front frame 12 and to the rear frame 11 and rotate toward the front frame 12, as FIG. 3 shows. The handle 14 along with the front frame 12 and the rear frame 11 then move close to the bottom frame 13. The relative movement between the front frame 12 and the rear frame 11 causes the first link 22 and the second link 23 of the linkage assembly 2 to move relatively to the seat frame 21 at same time and hence, the first link 22 brings the seat assembly to move toward the bottom frame 13, as FIG. 3 to FIG. 6 show. Since the first link 22 has connection with the backrest bracket 261, the first link 22 also brings the backrest bracket 261 to pivot on the seat frame 22 such that the backrest 26 positioned at the backrest bracket 261 can rotate toward the seat frame 21 regardless of the original reclined position. Additionally, for the reason that the second link 23 pivotally connecting between the front frame 12 and the armrest 24 is rigid in length, the second link 23 leads the armrest 24 toward the front wheels (or toward left as in FIG. 3). So does the tray 25 fixed at the second end 242 of the armrest 24 is driven toward the front wheels and the front end of the tray 25 is getting close to the bottom frame 13. Movements mentioned above are demonstrated on FIG. 3 to FIG. 6 clearly.

Figure 6:
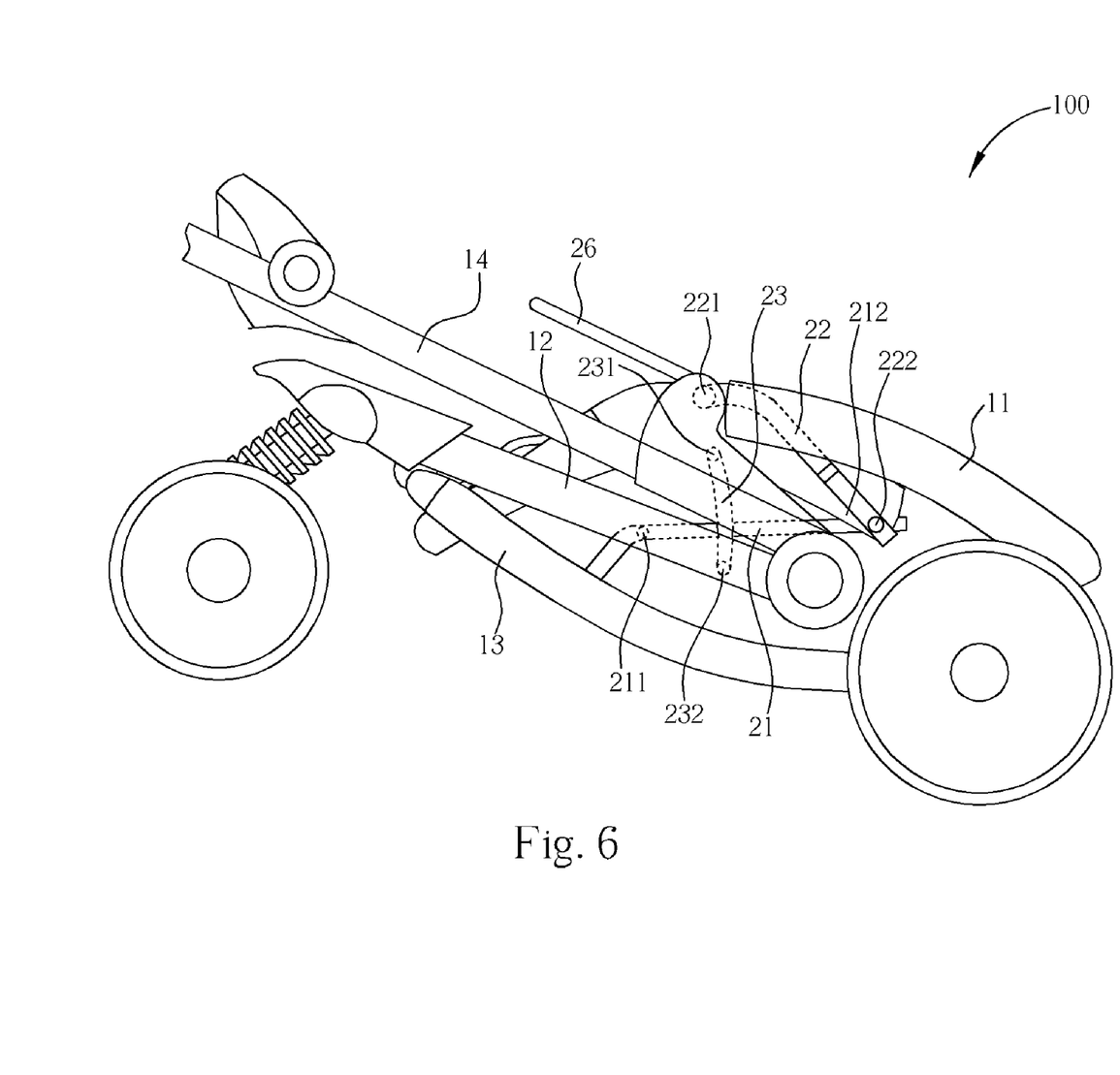

As the stroller 100 is folded to the position as in FIG. 6, the rear frame 11, the front frame 12, the bottom frame 13 of the frame body 1, and the seat assembly are substantially parallel with one another. And with the help of the second link 23, the linkage assembly 2 disclosed in the present invention brings the protecting guard of the seat assembly to a position that is also substantially parallel with the front frame 11, the rear frame 12, the bottom frame 13, and the handle 14 and therefore the stroller 100 according to the present invention has a smallest folded size.

The stroller having linkage assembly disclosed in the present invention applies links of the linkage assembly pivotally connecting between the handle and the armrest and between the front frame and the armrest, respectively. During the folding process of the stroller, the links drive the protecting guard (including the armrest and the tray) to move and rotate to a position such that the protecting guard is substantially parallel with the handle, the front frame, the rear frame, and the bottom frame, bringing the stroller of the present invention to a smallest size when in the folded position.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A stroller, comprising:
   a frame body comprising a handle, a rear frame, and a front frame, the handle pivotally connecting with the rear frame and the front frame;
   a seat assembly comprising a seat frame pivotally connected to the frame body and a protecting guard connected to the seat frame; and
   a linkage assembly comprising a first link and a second link respectively positioned at the rear of and at the front of the seat assembly, the first link pivotally connecting with the handle and the protecting guard, the second link pivotally connecting with the protecting guard and the front frame;
   wherein the linkage assembly brings the seat assembly to fold with the frame body, and the seat assembly, the handle, the rear frame, and the front frame are substantially parallel with one another while the stroller is in a folded position.

2. The stroller of claim 1 wherein the seat frame pivotally connects with the front frame and the protecting guard.

3. The stroller of claim 2 wherein the protecting guard comprises:
   two armrests pivotally connecting with two sides of the seat frame respectively, the first link pivotally connecting with a first end of the armrest; and
   a tray, connecting with a second end of the armrest.

4. The stroller of claim 3 wherein the first end of the armrest comprises a backrest bracket, the first link connecting with the backrest bracket.

5. The stroller of claim 4 wherein the seat assembly further comprises a backrest pivotally connecting with the backrest bracket.

6. The stroller of claim 1 wherein the first link is substantially L-shape.

7. The stroller of claim 1 wherein the handle further comprises a connector, the handle pivotally connecting with the rear frame and the front frame via the connector, the first link pivotally connecting with the connector and the protecting guard.

8. The stroller of claim 7 wherein the first link pivotally connects with the connector at which the connector pivotally connects with the rear frame.

9. A stroller, comprising:
   a frame body comprising a handle, a rear frame, and a front frame, the handle pivotally connecting with the rear frame and the front frame;

a seat assembly comprising a seat frame pivotally connected to the frame body and a protecting guard connected to the seat frame; and a linkage assembly comprising a first link and a second link, the first link pivotally connecting with the handle and the rear of the seat assembly, and the second link pivotally connecting with the protecting guard and the front frame;

wherein when the stroller is moved from an opened position to a folded position, the handle, the front frame and the rear frame pivot to approach to each other, so that the linkage assembly drives the protecting guard to move closely to the front frame and the rear frame at the same time.

10. A stroller, comprising:

a frame body comprising front wheels, a handle, a rear frame, and a front frame, the handle pivotally connecting with the rear frame and the front frame;

a seat assembly comprising a seat frame pivotally connected to the frame body and a protecting guard directly connected to the seat frame; and a linkage assembly connecting with the frame body and the seat assembly;

wherein when the stroller is moved from an opened position to a folded position, the linkage assembly drives the protecting guard to rotate and a front end of the protecting guard is moved toward the front wheels to bring the stroller to a smaller size.

11. The stroller of claim 10 wherein the linkage assembly further comprises a link pivotally connected with the protecting guard and the front frame.

12. The stroller of claim 10 wherein the protecting guard further comprises a pair of armrests pivotally connecting to two opposite sides of the seat frame respectively and a tray between the armrests connecting to the pair of armrests, the linkage assembly further comprising a link pivotally connected with the armrest and the frame body so as to drive the front end of the tray to move toward the front wheels.

13. The stroller of claim 10 wherein the linkage assembly comprises a first link and a second link respectively positioned at the rear of and at the front of the seat assembly.

14. A stroller, comprising:

a frame body comprising front wheels, a handle, a rear frame, and a front frame, the handle pivotally connecting with the rear frame and the front frame;

a seat assembly comprising a seat frame having a front end pivotally connected to the frame body and a protecting guard pivotally connected to a rear end of the seat frame; and a linkage assembly connecting with the frame body and the seat assembly;

wherein when the stroller is moved from an opened position to a folded position, the linkage assembly drives the protecting guard to rotate to bring the stroller to a smaller size.

15. The stroller of claim 14 wherein the linkage assembly comprises a first link and a second link respectively positioned at the rear of and at the front of the seat assembly.

16. The stroller of claim 14 wherein the linkage assembly comprises a first link pivotally connected with the handle and the rear of the seat assembly.

17. The stroller of claim 14 wherein the linkage assembly comprises a second link pivotally connected with the protecting guard and the front frame.

* * * * *